(12) United States Patent
Scheer

(10) Patent No.: US 12,497,170 B2
(45) Date of Patent: Dec. 16, 2025

(54) ABOVE-FLOOR WIRE ROUTING FOR AIRCRAFT CARGO HANDLING SYSTEM

(71) Applicant: GOODRICH CORPORATION, Charlotte, NC (US)

(72) Inventor: Dustin P. Scheer, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 174 days.

(21) Appl. No.: 18/310,692

(22) Filed: May 2, 2023

(65) Prior Publication Data
US 2024/0367792 A1    Nov. 7, 2024

(51) Int. Cl.
*B64D 9/00* (2006.01)

(52) U.S. Cl.
CPC .......... *B64D 9/00* (2013.01); *B64D 2009/006* (2013.01); *B64D 2221/00* (2013.01)

(58) Field of Classification Search
None
See application file for complete search history.

(56) References Cited

U.S. PATENT DOCUMENTS

| | | | |
|---|---|---|---|
| 5,004,192 A * | 4/1991 | Handler | H02G 3/045 174/101 |
| 7,198,227 B2 | 4/2007 | Olin et al. | |
| 8,515,656 B2 | 8/2013 | Reed et al. | |
| 9,162,765 B2 | 10/2015 | Huber | |
| 9,912,384 B1 | 3/2018 | McClatchy et al. | |
| 9,932,112 B1 * | 4/2018 | Harms | B64F 1/322 |
| 10,493,927 B1 | 12/2019 | Widmer et al. | |
| 10,522,990 B1 | 12/2019 | Klein | |
| 10,559,402 B1 | 2/2020 | Widmer et al. | |
| 10,604,228 B2 | 3/2020 | Harms et al. | |
| 10,787,260 B2 | 9/2020 | Scheer et al. | |
| 10,936,390 B2 | 3/2021 | Balasubramanian et al. | |
| 11,332,248 B2 | 5/2022 | Balasubramanian et al. | |
| 11,505,321 B2 | 11/2022 | Matsuoka et al. | |
| 2005/0277327 A1 * | 12/2005 | Aziz | H05K 7/1448 439/528 |
| 2009/0304482 A1 * | 12/2009 | Sanford | B64D 9/00 414/812 |
| 2010/0141430 A1 | 6/2010 | Steer | |
| 2011/0273313 A1 | 11/2011 | Hettwer | |
| 2016/0117536 A1 | 4/2016 | Johnsen | |
| 2019/0256227 A1 | 8/2019 | Balasubramanian et al. | |

(Continued)

FOREIGN PATENT DOCUMENTS

| EP | 3653503 A1 * | 5/2020 | B64D 9/00 |
|---|---|---|---|
| EP | 3725683 | 3/2023 | |

(Continued)

OTHER PUBLICATIONS

European Patent Office, European Partial Search Report dated Feb. 14, 2025 in Application No. 24173892.1.

(Continued)

*Primary Examiner* — Krystal Robinson
(74) *Attorney, Agent, or Firm* — SNELL & WILMER L.L.P.

(57) ABSTRACT

A above floor wiring system is disclosed herein. The above floor wiring system includes a tray including a sidewall, a wire bundle secured to the sidewall, and a junction card coupled to the sidewall and electrically coupled to the wire bundle.

18 Claims, 9 Drawing Sheets

(56) References Cited

U.S. PATENT DOCUMENTS

| | | |
|---|---|---|
| 2019/0313247 A1 | 10/2019 | Balasubramanian et al. |
| 2020/0102076 A1 | 4/2020 | Balasubramanian et al. |
| 2020/0156792 A1 | 5/2020 | Scheer et al. |
| 2020/0331610 A1 | 10/2020 | Kish et al. |
| 2020/0331635 A1 | 10/2020 | Kish et al. |
| 2020/0354109 A1 | 11/2020 | Polus |
| 2021/0028608 A1* | 1/2021 | Mohlman ................. H02G 1/06 |
| 2021/0086900 A1 | 3/2021 | Christoffersson |
| 2021/0110122 A1 | 4/2021 | Volkerink et al. |
| 2021/0313785 A1* | 10/2021 | Kellerman ........... H02G 3/0608 |
| 2022/0363389 A1 | 11/2022 | Urch |
| 2022/0363391 A1 | 11/2022 | Urch et al. |
| 2023/0068486 A1 | 3/2023 | Scherenberger |
| 2023/0168337 A1 | 6/2023 | Ring et al. |
| 2023/0177888 A1 | 6/2023 | Salter |
| 2024/0265340 A1 | 8/2024 | Volkerink et al. |

FOREIGN PATENT DOCUMENTS

| | | | |
|---|---|---|---|
| KR | 20150128359 A | * | 11/2015 |
| WO | 2015137105 | | 9/2015 |

OTHER PUBLICATIONS

USPTO; Non-Final Office Action dated Sep. 23, 2024 in U.S. Appl. No. 17/829,949.

European Patent Office, European Search Report dated Sep. 29, 2023 in Application No. 23176693.2.

European Patent Office, European Search Report dated Oct. 11, 2024 in Application No. 24181820.2.

U.S. Appl. No. 18/310,692, filed May 2, 2023 and entitled "Above-Floor Wire Routing for Aircraft Cargo Handling System", 32 pages.

U.S. Appl. No. 17/829,949, filed Jun. 1, 2022 and entitled "Short Range Data Transfer in Wireless Cargo Applications", 30 pages.

European Patent Office, European Search Report dated Feb. 14, 2025 in Application No. 24173892.1.

USPTO; Non-Final Office Action dated Aug. 27, 2025 in U.S. Appl. No. 17/829,949.

USPTO; Advisory Action dated Jun. 3, 2025 in U.S. Appl. No. 17/829,949.

USPTO; Non-Final Office Action dated Jul. 30, 2025 in Application No. 18/334, 116.

USPTO; Final Office Action dated Mar. 24, 2025 in U.S. Appl. No. 17/829,949.

* cited by examiner

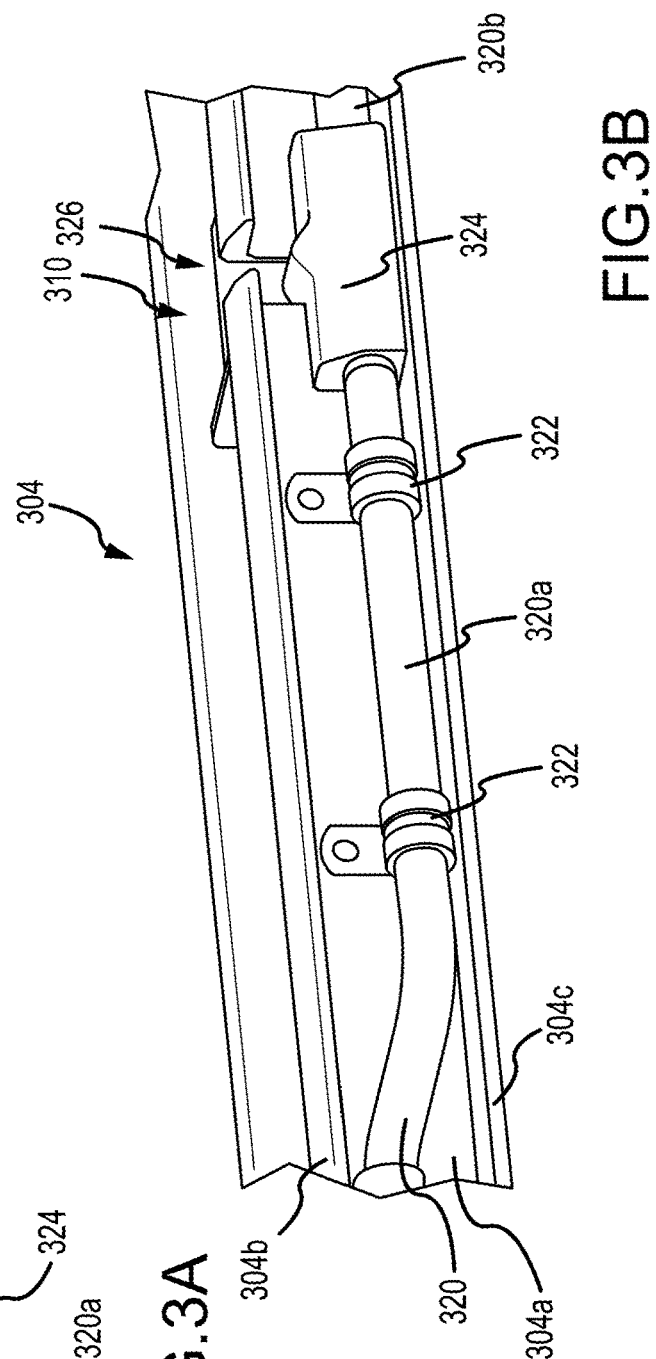
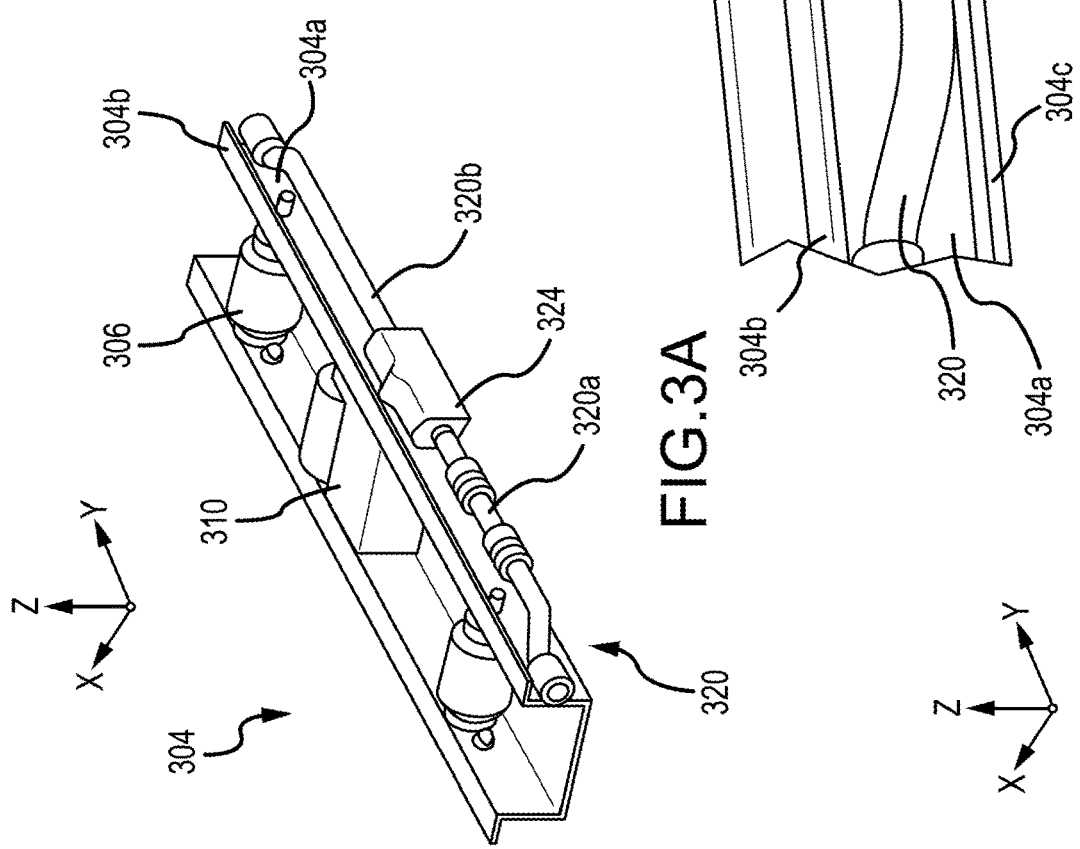

ABOVE-FLOOR WIRE ROUTING FOR AIRCRAFT CARGO HANDLING SYSTEM

FIELD

The present disclosure generally relates generally to cargo handling system, and more particularly, to above floor wire routing for aircraft cargo handling systems.

BACKGROUND

Aircraft cargo handling systems move cargo in the aircraft using powered rollers called Power Drive Units (PDU). The PDUs are connected to aircraft power and their control system through several wire harnesses. Typically, these wire harnesses are located under the floor of the cargo hold and pass through holes in the floor and/or supporting structure of the cargo hold to connect to the PDUs. This adds complexity to the design as the wires may be routed around many other aircraft subsystems that are also located below the floor and requires coordination to manage the many interface points where the wires come through the floor to connect to the PDUs. Additionally, cargo handling systems may include other powered line replaceable units (LRUs), such as sensors, that use power routed beneath the cargo hold. Routing cables under the cargo hold adds complexity to installation and maintenance operations due to having to access the area beneath the cargo hold, and sometimes behind the cargo hold walls.

SUMMARY

An above floor wiring system is disclosed herein. The above floor wiring system includes a tray including a sidewall, a wire bundle secured to the sidewall, and a junction card coupled to the sidewall and electrically coupled to the wire bundle.

In various embodiments, the above floor wiring system further includes a connector coupled to the wire bundle, the connector disposed at a first side of the tray, and a ground wire coupled to the connector and to the tray. In various embodiments, the above floor wiring system further includes a post coupled to the junction card and the tray, the post securing the junction card to the tray and electrically grounding the junction card.

In various embodiments, the above floor wiring system further includes a hole formed through the sidewall of the tray and a surface mount connector coupled to the junction card and extending through the hole. In various embodiments, the above floor wiring system further includes a slot formed in the sidewall and a pigtail connector coupled to the junction card and extending through the slot. In various embodiments, the above floor wiring system further includes a support bracket coupled to the sidewall and extending over the slot.

In various embodiments, the above floor wiring system further includes a housing formed over the junction card and a clamp securing the wire bundle to the tray.

Also disclosed herein is a cargo handling system. The cargo handling system includes a floor including an upper surface, a first tray coupled to the upper surface of the floor, the first tray extending in a first direction, a first wire bundle coupled to the first tray, and a first junction card coupled to the first tray and coupled to the first wire bundle.

In various embodiments, the cargo handling system further includes a second tray coupled to the upper surface of the floor, the second tray disposed adjacent the first tray and extending in a second direction orthogonal to the first direction, a second wire bundle having a first end and a second end, the first end of the second wire bundle coupled to the first junction card, and a second junction card coupled to the second tray and the second end of the second wire bundle. In various embodiments, the cargo handling system further includes a wall extending from the upper surface of the floor, wherein the first wire bundle is further coupled directly to the wall, and a third junction card coupled to the wall and coupled to the first wire bundle.

In various embodiments, the cargo handling system further includes a line replaceable unit connector coupled to the wall and a third wire bundle coupled to the third junction card at a first end and coupled to the line replaceable unit connector at a second end. In various embodiments, the cargo handling system further includes a unit load device disposed on the upper surface of the floor and a fourth wire bundle having a first end and a second end, the first end of the fourth wire bundle coupled to the unit load device and the second end of the fourth wire bundle coupled to the line replaceable unit connector.

In various embodiments, the cargo handling system further includes a connector coupled to the first wire bundle, a power source coupled to the connector, and a ground wire coupled to the connector and to the first tray. In various embodiments, the cargo handling system further includes a post coupled to the first junction card and the first tray, the post securing the first junction card to the first tray and electrically grounding the first junction card.

Also disclosed herein is an aircraft including a cargo deck and a cargo handling system disposed within the cargo deck. The cargo handling system includes a floor having an upper surface, a first tray coupled to the upper surface of the floor, a second tray coupled to the upper surface of the floor, the second tray disposed adjacent the first tray, a first wire bundle having a first end and a second end, a first connector coupled to the first end of the first wire bundle, a first junction card coupled to the second end of the first wire bundle and to the first tray, a second wire bundle having a first end and a second end, a second junction card coupled to the first end of the second wire bundle and to the second tray, and a second connector coupled to the second end of the second wire bundle, wherein the second connector is coupled to the first connector.

In various embodiments, the cargo handling system further includes a power source and a third wire bundle having a first end and a second end, the first end of the third wire bundle coupled to the power source and the second end of the third wire bundle coupled to the first junction card. In various embodiments, the cargo handling system further includes an opening formed through the first tray and a surface mount connector coupled to the first junction card, the surface mount connector extending through the opening in the first tray.

In various embodiments, the cargo handling system further includes a slot formed in the second tray and a pigtail connector coupled to the second junction card, the pigtail connector extending through the slot in the second tray. In various embodiments, the cargo handling system further includes a third wire bundle having a first end and a second end, the first end of the third wire bundle coupled to the first junction card and a line replaceable unit connector coupled to the second end of the third wire bundle. In various embodiments, the cargo handling system further includes a first ground wire coupled to the first connector and to the first tray and a second ground wire coupled to the second connector and to the second tray.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A and 3B illustrate views of a tray including above floor wire routing, in accordance with various embodiments.

DETAILED DESCRIPTION

Figure 1A:
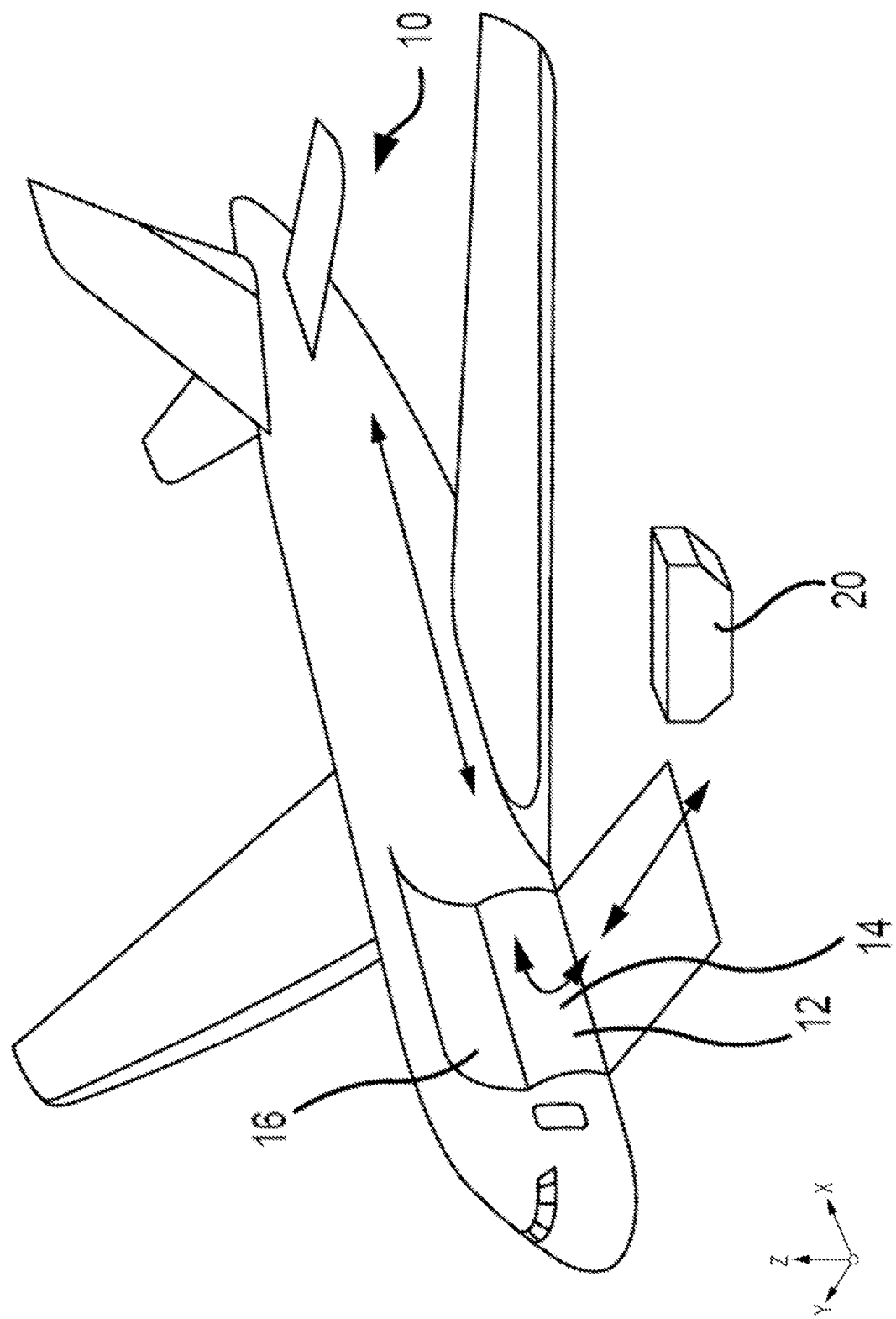
FIG. 1A illustrates a schematic view of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an improved above floor wire routing system for aircraft cargo handling systems that address problems with current wire routing systems. Typically, wire bundles used with aircraft cargo handling systems include many individual wires that are routed to the various line replaceable units (LRUs) in the cargo handling system. The LRUs are installed in trays in the cargo handling systems and the wires in the wire bundle connect to the LRU. The diameter of the wire bundle increases as the number of wires included increases. This results in the use of larger connectors to splice wires and LRUs into the cargo handling system. There also exist problems with routing the wires from the wire bundle to the LRU. Typical systems include passing the entire wire bundle through an opening in the tray, connect to the LRU, or other component, and pass the entire wire bundle back through the opening in the tray. This is cumbersome and inefficient. Similarly, there are difficulties within typical cargo handling systems of routing wires between multiple trays, LRUs, and/or unit load devices (ULDs).

Disclosed herein is a floor wire routing system that, in various embodiments, improves the protection of the wire bundle, simplifies addition of LRUs, simplifies connections between wire bundles, uses less space and provides improved protection over typical wire routing systems. In various embodiments, the wire routing system includes a junction card that is spliced into the wire bundle providing a space efficient junction for connections to an LRU. In various embodiments, the junction card is coupled to the tray using one or more posts. In various embodiments, a molded cover houses the junction card and posts, providing protection from the elements and cargo. In various embodiments, the wire bundle includes a connector at each end of the tray. In various embodiments, each connector is electrically ground to the tray by one or more ground wires. This tends to result in a decrease in the number of wires in the wire bundle and an improved ground plane. In various embodiments, the posts ground the junction card to the tray, the cargo system, and the aircraft. In various embodiments, this tends to reduce the number of grounding connections as each LRU is automatically grounded to the cargo handling system. In various embodiments, a connector may be coupled to the junction card to provide power and/or data to the LRU. In various embodiments, multiple connectors may be spliced into a single wire bundle with little to no effect on the size or safety of the wire bundle. In various embodiments, the junction card may be used for addressing the LRU coupled to the junction card. In various embodiments, the wire bundle may be armored using a flexible, protected cable. In various embodiments, the flexible, protected cable may be coupled to a sidewall of the cargo handling system and/or the aircraft to provide additional power and/or data connections.

Referring now to FIG. 1A, a schematic view of an aircraft 10 having a cargo deck 12 located within a cargo compartment 14 is illustrated, in accordance with various embodiments. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. Once inside aircraft 10, ULD 20 is moved within cargo compartment 14 to a final stowed position. Multiple ULDs may be brought on-board aircraft 10, with each ULD 20 being placed in a respective stowed position on cargo deck 12. After aircraft 10 has reached its destination, each ULD 20 is unloaded from aircraft 10 in similar fashion, but in reverse sequence to the loading procedure. To facilitate movement of ULD 20 along cargo deck 12, aircraft 10 may include a cargo handling system as described herein in accordance with various embodiments.

Figure 1B:
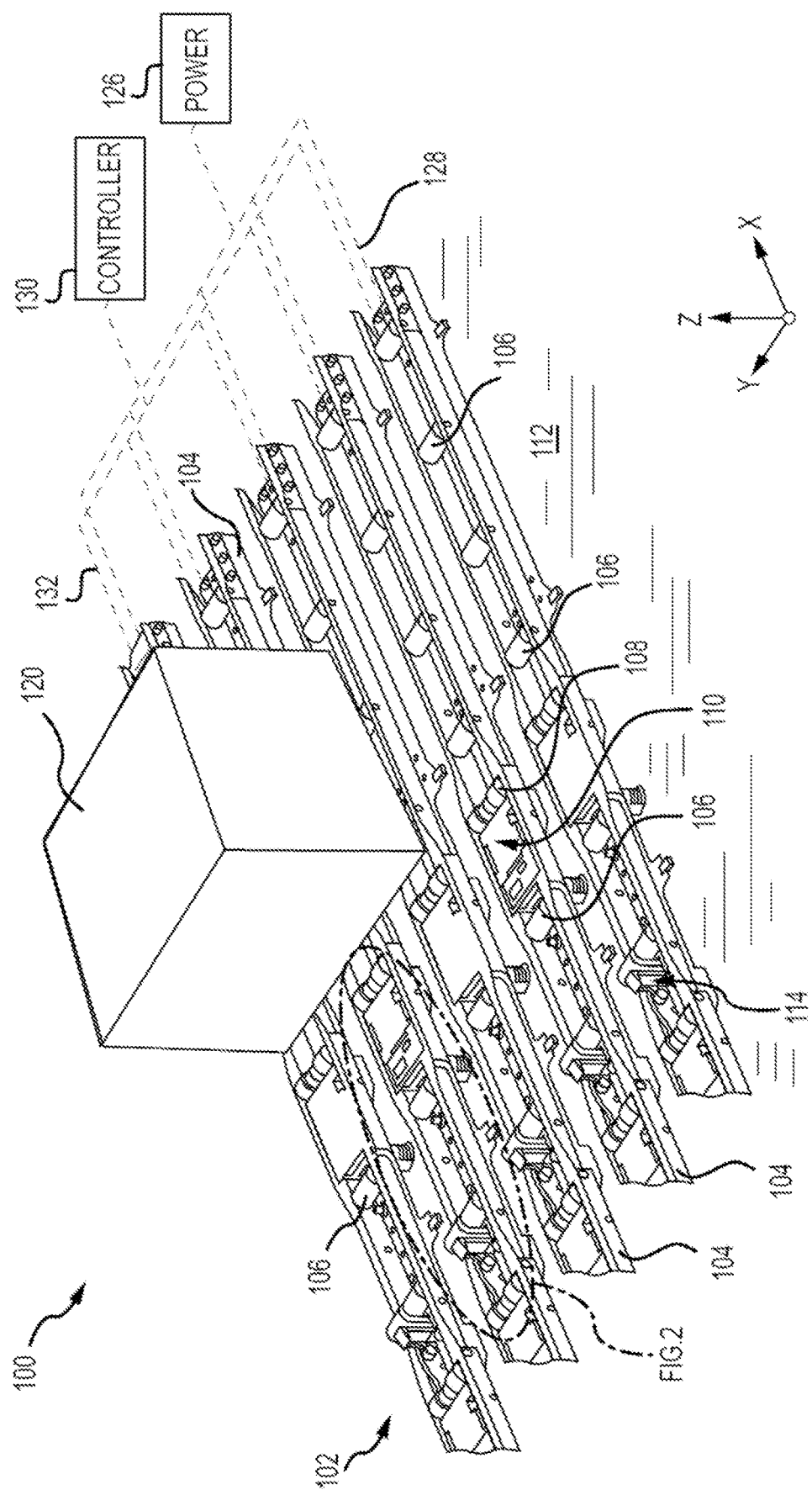
FIG. 1B illustrates a portion of a cargo handling system, in accordance with various embodiments.

Referring now to FIG. 1B, a portion of a cargo handling system 100 is illustrated, in accordance with various embodiments. Cargo handling system 100 is illustrated with reference to an XYZ coordinate system, with the X-direction extending longitudinally aft and the Z-direction extending vertically with respect to an aircraft in which cargo handling system 100 is positioned, such as, for example, aircraft 10 described above with reference to FIG. 1A. In various embodiments, cargo handling system 100 may define a conveyance surface 102 having a plurality of trays 104 supported by a cargo deck 112, such as, for example, cargo deck 12 described above with reference to FIG. 1A. Plurality of trays 104 may be configured to support a unit load device (ULD) 120 (or a plurality of ULDs), such as, for example, unit load device (ULD) 20 described above with reference to FIG. 1A. In various embodiments, ULD 120 may comprise a container or a pallet configured to hold cargo as described above. In various embodiments, plurality of trays 104 is disposed throughout cargo deck 112 and may support a plurality of conveyance rollers 106, where one or more or all of plurality of conveyance rollers 106 is a passive roller.

In various embodiments, plurality of trays 104 may further support a plurality of power drive units (PDUs) 110, each of which may include one or more drive rollers 108 that may be actively powered by a motor. In various embodiments, one or more of plurality of trays 104 is positioned longitudinally along cargo deck 112—e.g., along the X-direction extending from the forward end to the aft end of aircraft 10. In various embodiments, plurality of conveyance rollers 106 and one or more drive rollers 108 may be configured to facilitate transport of ULD 120 in the forward and the aft directions along conveyance surface 102. During loading and unloading, ULD 120 may variously contact the one or more drive rollers 108 to provide a motive force for transporting ULD 120 along conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath conveyance surface 102 to an elevated position above conveyance surface 102 by the corresponding PDU 110. As used with respect to cargo handling system 100, the term "beneath" may refer to the negative Z-direction, and the term "above" may refer to the positive Z-direction with respect to conveyance surface 102. In the elevated position, the one or more drive rollers 108 variously contact and drive ULD 120 that otherwise rides on the plurality of conveyance rollers 106. Other types of PDUs 110, which can also be used in various embodiments of the present disclosure, may include a drive roller that is held or biased in a position above conveyance surface 102 by a spring. PDUs 110 as disclosed herein may be any type of electrically powered rollers that may be selectively energized to propel or drive ULD 120 in a desired direction over cargo deck 112 of aircraft 10. The plurality of trays 104 may further support a plurality of restraint devices 114. In various embodiments, each of the plurality of restraint devices 114 may be configured to rotate downward as ULD 120 passes over and along conveyance surface 102. Once ULD 120 passes over any such one of the plurality of restraint devices 114, such restraint device returns to its upright position, either by a motor driven actuator or a bias member, thereby restraining or preventing ULD 120 from translating in the opposite direction. In various embodiments, the plurality of trays 104 may further support one or more sensors, restraints, or other line replaceable units (LRUs).

In various embodiments, cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using system controller 130. In various embodiments, system controller 130 may be configured to selectively activate or deactivate the plurality of PDUs 110. Thus, cargo handling system 100 may receive operator input through system controller 130 to control the plurality of PDUs 110 in order to manipulate movement of ULD 120 over conveyance surface 102 and into a desired position on cargo deck 112. In various embodiments, system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. Cargo handling system 100 may also include a power source 126 configured to supply power to the plurality of PDUs 110 or to the plurality of restraint devices 114 via one or more power buses 128.

Figure 2A:
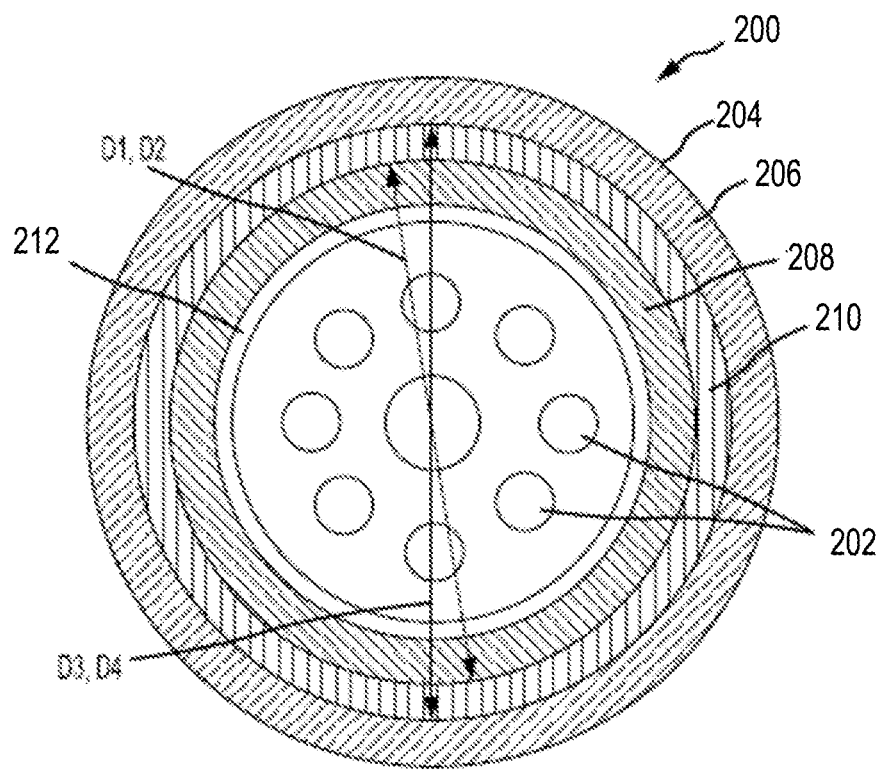
FIG. 2A illustrates a cross-section view of an electrical harness, in accordance with various embodiments.
Figure 2B:
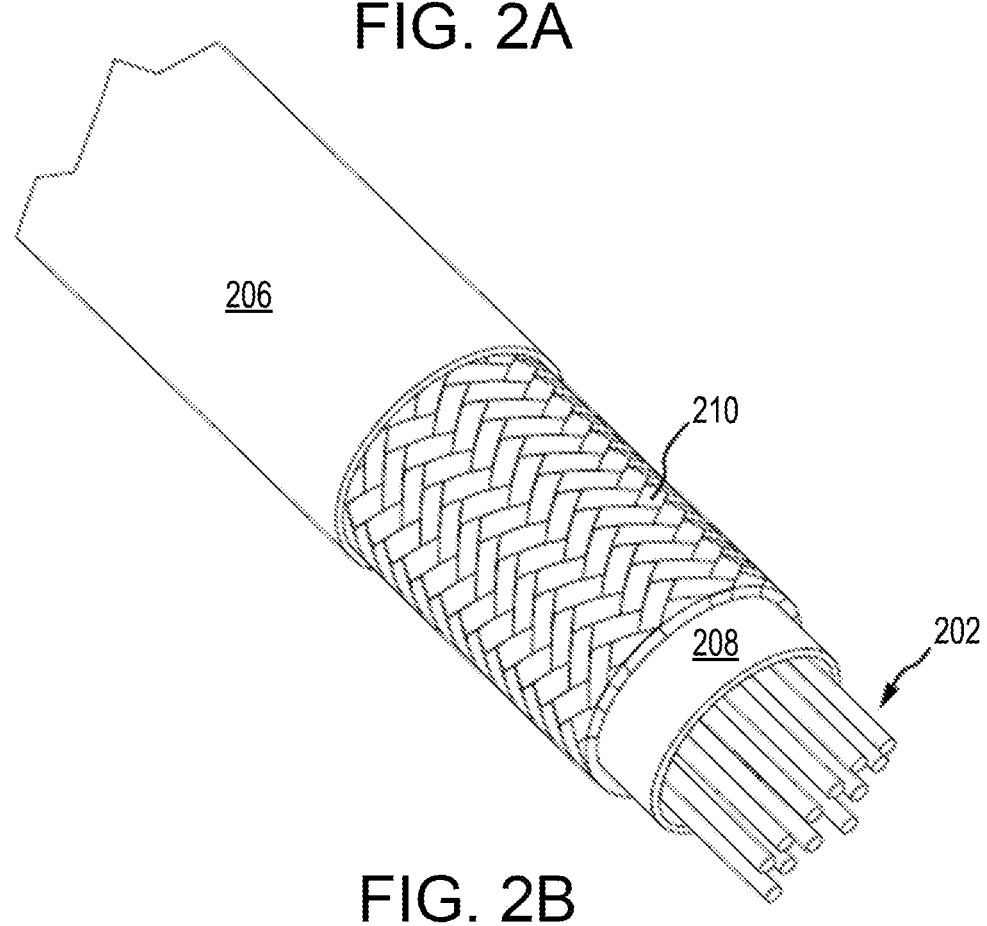
FIG. 2B illustrates a partial cutaway view of an electrical harness, in accordance with various embodiments.

Referring now to FIGS. 2A and 2B, a cross-section view and a perspective view of an electrical harness 200 are illustrated, in accordance with various embodiments. Electrical harness 200 may include an electrical cable 212 comprising a plurality of wires 202 disposed within an armored electrical harness 204 comprising an outer tubing 206, an inner tubing 208, and a braid tubing 210 disposed between inner tubing 208 and outer tubing 206. In various embodiments, outer tubing 206 and inner tubing 208 are made from a polymeric material, including thermosetting and/or thermoplastic polymers, such as a polyurethane, among others. In various embodiments, braid tubing 210 comprises a wire braided tube or sleeve made from a metallic material, such as stainless steel, among others. In various embodiments, braid tubing 210 comprises a wire braided tube or sleeve made from metal-coated fibers. In various embodiments, braid tubing 210 comprises a braided tube or sleeve made from a non-metallic material. With momentary reference to FIG. 2B, braid tubing 210 includes wires tightly braided together to form a generally cylindrical tubing. Furthermore, inner tubing 208 and outer tubing 206 generally conform to the cylindrical shape of braid tubing 210. With respect to FIG. 2B, elements with like element numbering, as depicted in FIG. 2A, are intended to be the same and will not necessarily be repeated for the sake of clarity.

In various embodiments, and with reference to FIG. 2A, inner tubing 208 may be disposed about electrical cable 212. Inner tubing 208 may encase electrical cable 212. In various embodiments, inner tubing 208 encases a plurality of wires 202 of electrical cable 212. Inner tubing 208 may be formed over the plurality of wires 202 via a polymer extrusion manufacturing process in which a polymer is melted and formed in a continuous profile along the length of electrical harness 200. Braid tubing 210 may be disposed about inner tubing 208. Braid tubing 210 may encase inner tubing 208. Inner diameter D1 of braid tubing 210 may be substantially equal to outer diameter D2 of inner tubing 208. In this regard, the inner diameter surface of braid tubing 210 may be in contact with the outer diameter surface of inner tubing 208. Outer tubing 206 may be disposed about braid tubing 210. Outer tubing 206 may encase braid tubing 210. Outer tubing 206 may be formed over braid tubing 210 via a polymer extrusion manufacturing process in which a polymer is melted and formed in a continuous profile along the length of electrical harness 200. Outer diameter D3 of braid tubing 210 may be substantially equal to inner diameter D4 of outer tubing 206. In this regard, the outer diameter surface of braid tubing 210 may be in contact with the inner diameter surface of outer tubing 206.

In various embodiments, braid tubing 210 is compressed between outer tubing 206 and inner tubing 208. Due to the relatively soft, elastic nature of outer tubing 206 and inner tubing 208, braid tubing 210 may embed into outer tubing 206 and inner tubing 208, thereby mechanically locking with outer tubing 206 and inner tubing 208 which prevents braid tubing 210 from slipping against outer tubing 206 and inner tubing 208. Thus, braid tubing 210 is in physical contact with outer tubing 206 and inner tubing 208. In this manner, outer tubing 206 and inner tubing 208 compresses braid tubing 210 such that braid tubing 210 maintains a common diameter along the length of electrical harness 200.

Referring now to FIGS. 3A and 3B, perspective view of a tray 304 are illustrated, in accordance with various embodiments. In various embodiments, tray 304 may be one of the plurality of trays 104 described above in FIG. 1B. Tray 304 includes a sidewall 304a, a top portion 304b, and a bottom portion 304c. Tray 304 further supports one or more rollers 306, a power drive unit (PDU) 310, a cable 320, clamps 322, and an electric connector 324. In various embodiments, PDU 310 may be an example of PDU 110 and rollers 306 may be examples of conveyance rollers 106 described above in FIG. 2B. In various embodiments, cable 320 may be an example of electrical harness 200 described above in FIGS. 2A and 2B. In various embodiments, tray 304 may further support one or more sensors.

In various embodiments, cable 320 may be coupled to sidewall 304a by one or more clamps 322. In various embodiments cable 320 may run the length of tray 304 (e.g., parallel to the x-axis). In various embodiments, electric connector 324 may be spliced into cable 320 to provide power to PDU 310. Splicing electric connector 324 into cable 320 may include separating cable 320 into a first portion 320a and a second portion 320b. Electric connector 324 may then be coupled to each portion of cable 320 such that first portion 320a is electrically coupled a first side of electric connector 324 and second portion 320b is electrically coupled to a second side of electric connector 324.

In various embodiments, a hole may be formed through sidewall 304a through which electric connector 324 passes to connect to PDU 310. In various embodiments, such as illustrated in FIG. 3B, a slot 326 may be cut through tray 304, and more specifically, through top portion 304b and sidewall 304a through which electric connector 324 passes to connect to PDU 310. In various embodiments, one or more holes and/or slots 326 may be formed in tray 304 to power multiple line replaceable units (LRUs).

Referring now to FIGS. 4A-4D, a junction card 402 for use with tray 304 is illustrated, in accordance with various embodiments. In various embodiments, junction card 402 may be an example of electric connector 324 described above in FIGS. 3A and 3B. Junction card 402 may be spliced into a power cable used with tray 304. In various embodiments, junction card 402 may be a printed circuit assembly (PCA) that passes power and/or signals from a first end to a second end, including one or more connections between the first end and the second end. Junction card 402 includes a board 404, a first plurality of pads 406, a second plurality of pads 408, a third plurality of pads 410, and one or more posts 412.

Board 404 includes a first end 404a and a second end 404b. In various embodiments, board 404 may be a printed circuit board (PCB) configured to connect electric and/or electronic components to one another. In various embodiments, board 404 may be single sided (e.g., a single conductive layer), double sided (e.g., two conductive layers), or multi-layer (e.g., alternating conductive layers).

The first plurality of pads 406 is configured to be electrically coupled to a first cable (e.g., first portion 320a of cable 320) and the second plurality of pads 408 is configured to be electrically coupled to a second cable (e.g., second portion 320b of cable 320). The third plurality of pads 410 is configured to be electrically coupled to an LRU (e.g., PDU 310). The plurality of pads 406, 408, 410, in various embodiments, may be through-holes formed through board 404. In various embodiments, the plurality of pads 406, 408, 410 may be surface pads formed on board 404. In various embodiment, the plurality of pads 406, 408, 410 may be a combination of through-hole and surface pad. In various embodiments, the first cable and/or the second cable may be soldered to junction card 402. In various embodiments, the first cable and/or the second cable may be coupled to junction card 402 by wire wrapping, using a terminal block, or other methods.

The one or more posts 412 are configured to secure junction card 402 to tray 304. In various embodiments, the one or more posts 412 may be a bolt that passes through sidewall 304a of tray 304 and is secured by a nut on each side. In various embodiments, the one or more posts 412 may be used as a ground connector for the first cable and the second cable, as will be discussed in further detail below.

Figure 4B:
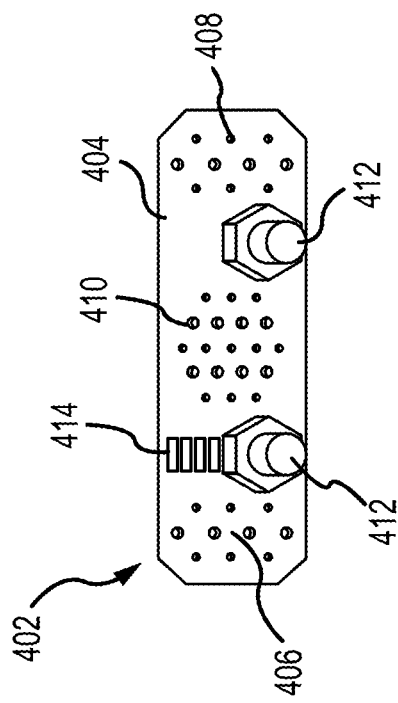
FIGS. 4A, 4B, 4C, and 4D illustrate views of couplers used in above floor wire routing, in accordance with various embodiments.

Referring now to FIG. 4B, in various embodiments, junction card 402 may further includes a plurality of selectors 414. The plurality of selectors 414 may be used to select an address for the LRU connected to junction card 402, such as in a pin selection. In various embodiments, the plurality of selectors 414 may be a plurality of resistors having low electrical resistance that are soldered to board 404. One or more of the plurality of resistors (i.e., selectors 414) may be added or removed to identify the address of the LRU. In various embodiments, the plurality of selectors 414 may be a plurality of jumper pins soldered to board 404. One or more connectors may be placed on or removed from one or more pairs of jumper pins (i.e., selectors 414) to identify the address of the LRU. In various embodiments, the plurality of selectors 414 may be a plurality of dip switches coupled to board 404. One or more of the plurality of dip switches (i.e., selectors 414) may be toggled to identify the address of the LRU.

Figure 4D:
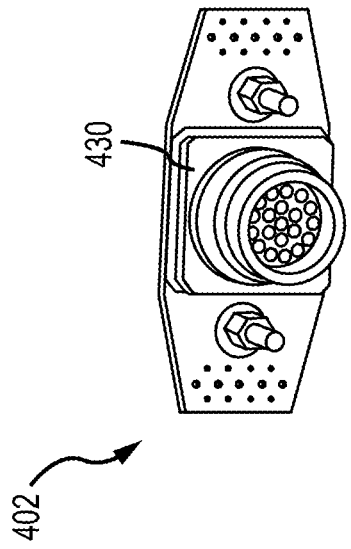
Figure 4A:
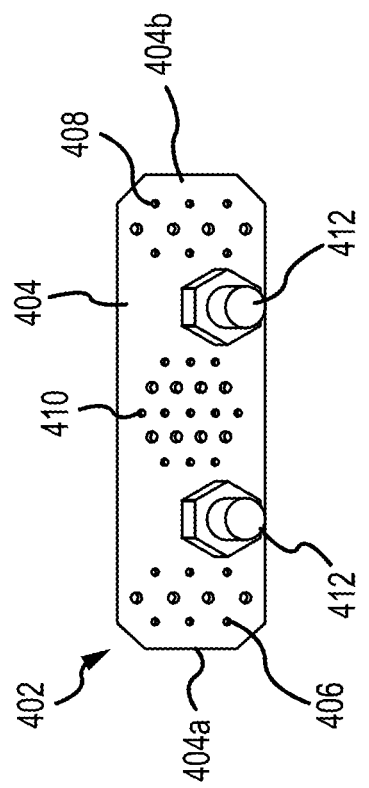
Figure 4C:
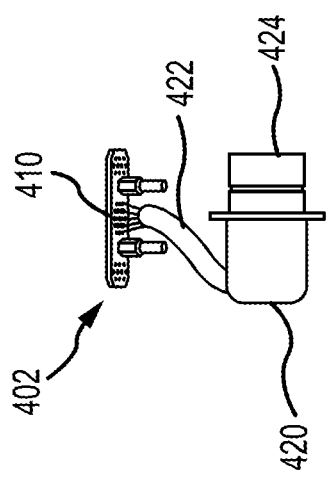

Referring now to FIG. 4C, a pigtail connector 420 coupled to junction card 402 is illustrated, in accordance with various embodiments. Pigtail connector 420 includes a tail 422 and a connector 424. A first end of tail 422 is coupled to board 404, and more specifically, to the third plurality of pads 410. A second end of tail 422 is coupled to connector 424. Connector 424 may be any suitable connector that is configured to connect to an LRU (e.g., PDU 310). In various embodiments, tail 422 may fit through a hole in sidewall 304a of tray 304. In various embodiments, tail 422 may be inserted into slot 326 of tray 304.

Referring now to FIG. 4D, a surface mount connector 430 coupled to junction card 402 is illustrated, in accordance with various embodiments. Surface mount connector 430 is coupled to the third plurality of pads 410 on board 404. Surface mount connector 430 may be any suitable connector that is configured to connect to an LRU (e.g., PDU 310). In various embodiments, surface mount connector 430 is small enough to pass through a hole in sidewall 304a of tray 304. In various embodiments, surface mount connector 430 may pass through slot 326 in tray 304.

Figure 5C:
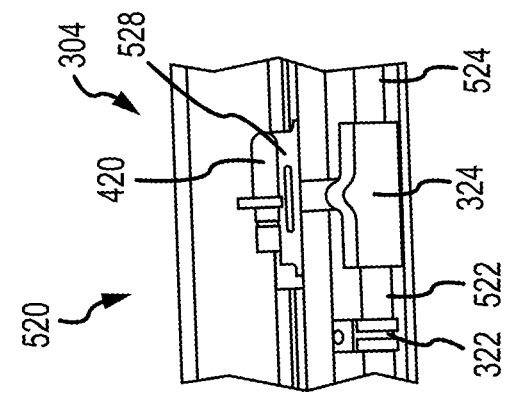
FIGS. 5A, 5B, 5D, and 5D illustrate views of couplers joined to trays for use in above floor wire routing, in accordance with various embodiments.
Figure 5B:
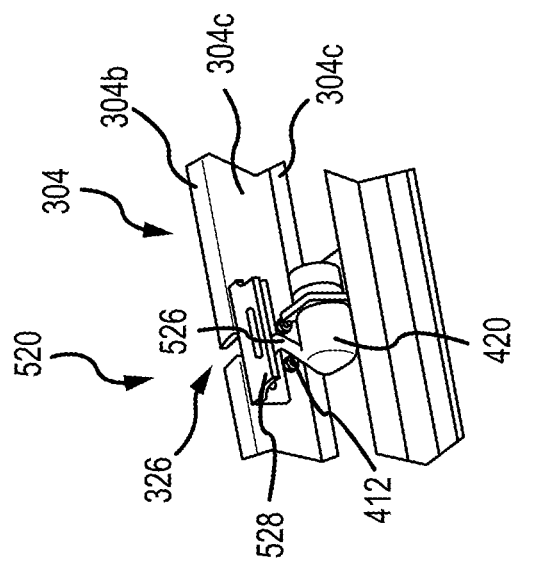
Figure 5A:
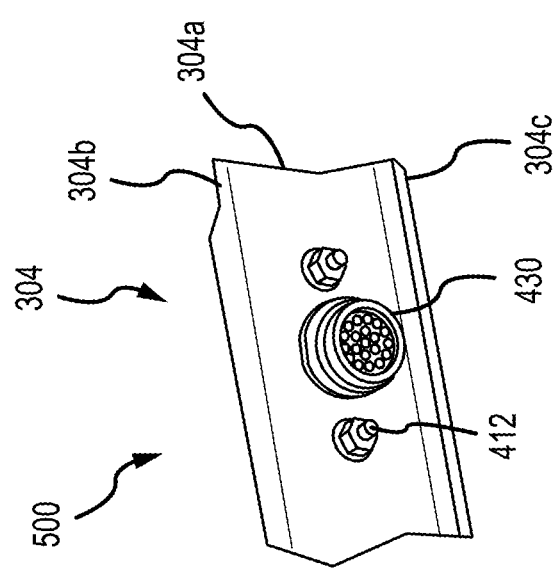
Figure 5D:
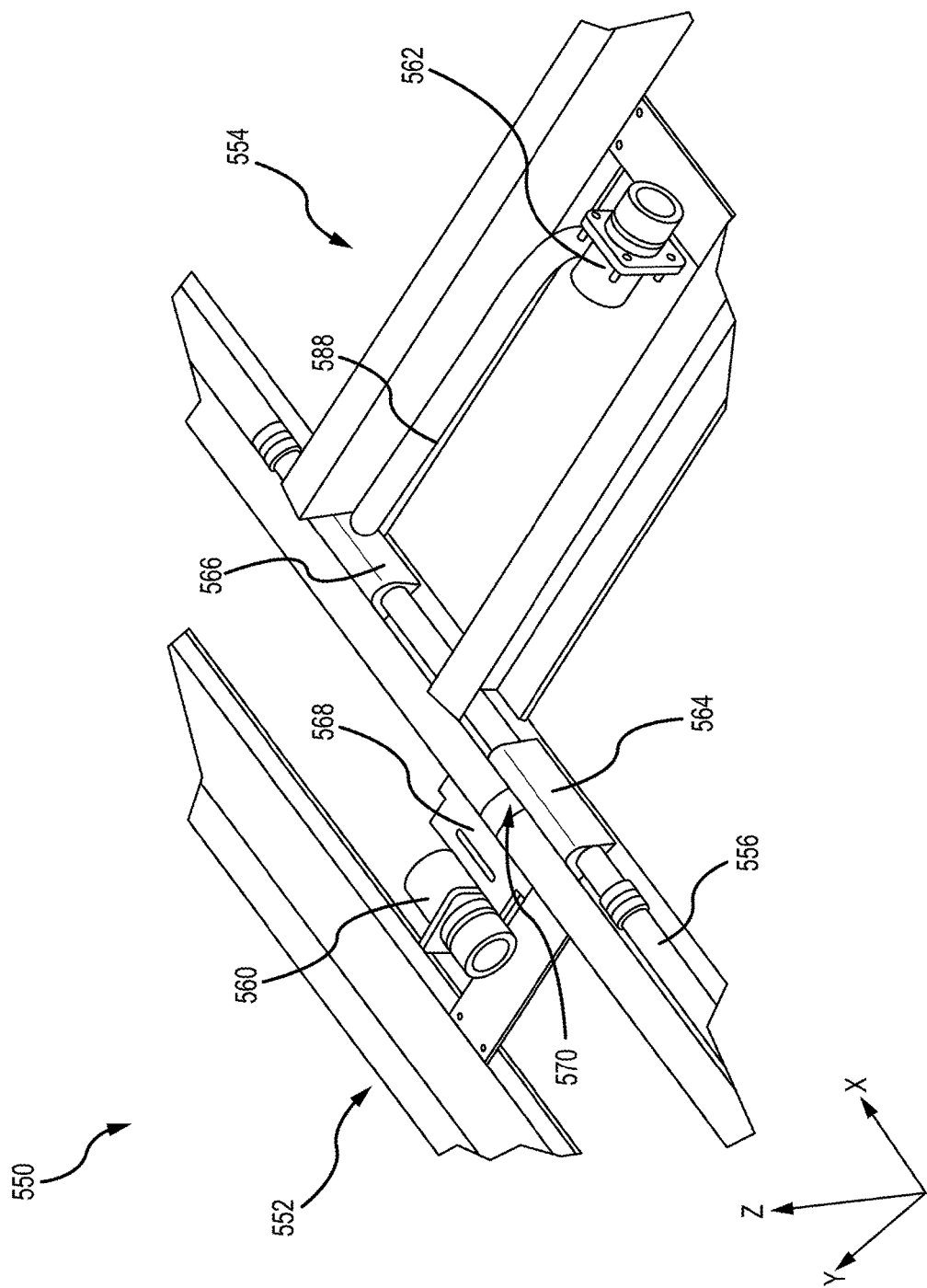

Referring now to FIGS. 5A-5D, views of electric connectors are illustrated, in accordance with various embodiments. FIG. 5A illustrates a perspective view of the connector side of a wire routing system 500. FIGS. 5B and 5C illustrate perspective views of a wire routing system 520. FIG. 5D illustrates a perspective view of a wire routing system 550. The wire routing systems 500, 520, 550 illustrated and described herein are for description and understanding and are not intended to be limiting.

Wire routing system 500, illustrated in FIG. 5A, includes an electric connector coupled to a tray 304. tray 304 includes sidewall 304a, top portion 304b, and bottom portion 304c. The electric connector includes posts 412 and surface mount connector 430, each of which extends through sidewall 304a of tray 304. Surface mount connector 430 is illustrated having a circular cross section. In various embodiments, surface mount connector 430 may have a rectangular, square, D-shape cross section, among others. In various embodiments, a size of the hole in sidewall 304a may vary based on a size of surface mount connector 430. In various embodiments, the size of the hole has an upper size threshold, above which the strength of tray 304 may be compromised. Therefore, surface mount connector 430 has a relatively significant size without compromising the strength of tray 304.

Wire routing system 520, illustrated in FIGS. 5B and 5C, includes a pigtail connector 420, an electric connector 324, a tray 304, a first cable 522, a second cable 524, a third cable 526, and a support bracket 528. Tray 304 includes a sidewall 304a, a top portion 304b, and a bottom portion 304c. A slot 326 is formed through top portion 304b and sidewall 304a. Electric connector 324 includes a junction card such as junction card 402 described above in FIGS. 4A-4D. First cable 522 and second cable 524 are spliced together using the junction card in electric connector 324. Third cable 536 is electrically coupled to the junction card and extends through slot 326 and is connected to pigtail connector 420. As discussed above, a hole that is larger than the upper size threshold may comprise the strength of tray 304. In various embodiments, a size of slot 326 may be larger the upper threshold. Accordingly, support bracket 528 is coupled to tray 304, over slot 326, to provide structural support through tray 304.

Wire routing system 550, illustrated in FIG. 5D, includes a first tray 552, a second tray 554, a first cable 556, a second cable 558, a first pigtail connector 560, a second pigtail connector 562, a first electric connector 564, and a second electric connector 566. In various embodiments, first tray 552 and second tray 554 may be examples of tray 304 described above in FIGS. 3A and 3B. In various embodiments, first cable 556 and second cable 558 may be examples of electrical harness 200 described above in FIGS. 2A and 2B. In various embodiments, first pigtail connector 560 and second pigtail connector 562 may be examples of pigtail connector 420. In various embodiments, first electric connector 564 and second electric connector 566 may be examples of electric connector 324 including a junction card 402.

First tray 552 extends in a first direction (e.g., parallel to the x-axis) and second tray 554 extends in a second direction (e.g., parallel to the y-axis) that is perpendicular to the first direction. That is, first tray 552 and second tray 554 form a T-junction over which power is shared. In various embodiments, second tray 554 may be coupled to first tray 552. In various embodiments, second tray 554 may not physically contact first tray 552.

First cable 556 extends along first tray 552 and second cable 558 extends along second tray 554. First cable 556 includes two splices, first electric connector 564 and second electric connector 566. First electric connector 564 is connected to first pigtail connector 560 that extends through a slot 570 in first tray 552. A support bracket 568 may be coupled to first tray 552 to provide structural support adjacent slot 570. Second electric connector 568 is connected to second pigtail connector 562 by second cable 558. As illustrated, second cable 558 does not extend through either first tray 552 or second tray 554.

As illustrated and described herein, first electric connector 564 and second electric connector 566, each including a junction card, provide an efficient, secure, and space saving package for connecting various line replaceable units (LRUs) (e.g., power drive unit (PDU)) that may be disposed in either first tray 552 and/or second tray 554.

Figure 6C:
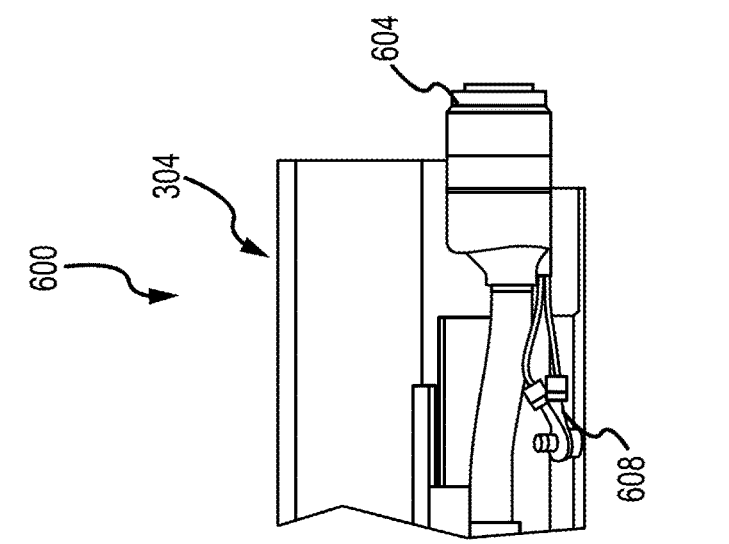
FIGS. 6A, 6B, and 6C illustrate views of couplers joined to trays for use in above floor wire routing, in accordance with various embodiments.
Figure 6B:
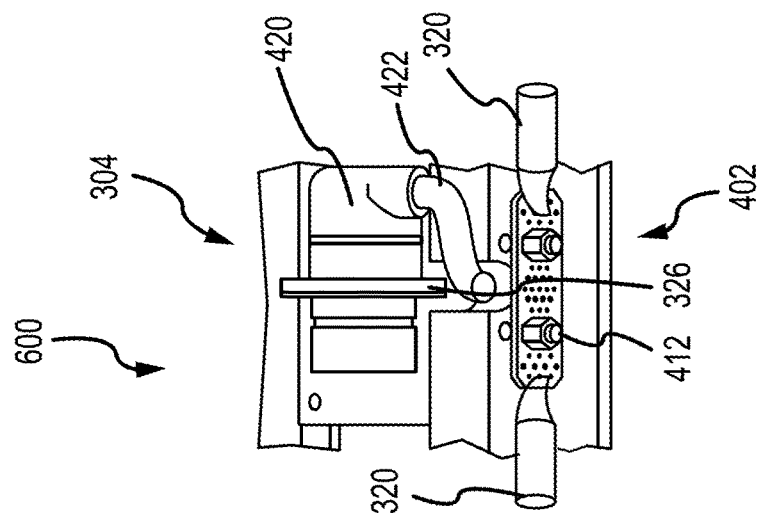
Figure 6A:
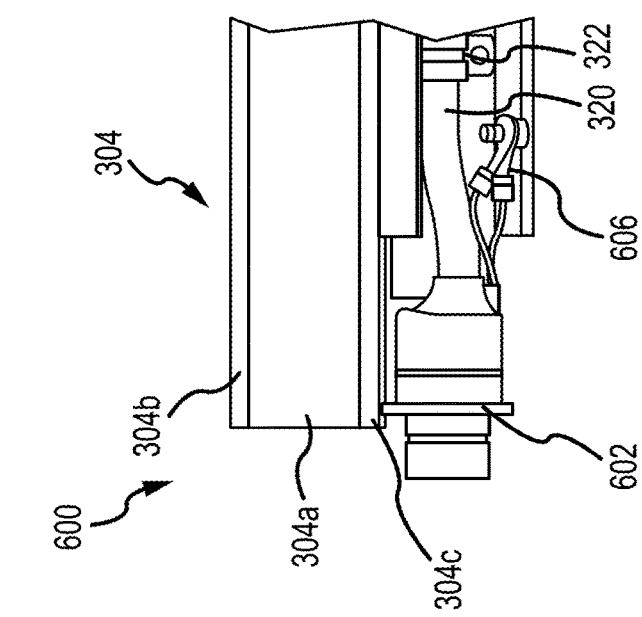

Referring now to FIGS. 6A-6C, a wire routing system 600 for providing power to line replaceable units (LRUs) using above floor wire routing is illustrated, in accordance with various embodiments. Wire routing system 600 includes a tray 304, a cable 320, a junction card 402, a pigtail connector 420, a first end connector 602, a second end connector 604, a first ground wire 606, and a second ground wire 608. FIG. 6A is a first end of tray 304, FIG. 6B is a middle portion of tray 304, and FIG. 6C is a second end of tray 304. First end connector 602 and second end connector 604 are positioned and configured to couple with a corresponding connector on an adjacent tray.

A first end of first ground wire 606 is coupled to first end connector 602 and a second end of first ground wire 606 is coupled to tray 304. A first end of second ground wire 608 is coupled to second end connector 604 and a second end of second ground wire 608 is coupled to tray 304. In so doing, tray 304 becomes a ground plane for cable 320. This reduces a size and weight of cable 320 by removing the ground wires from cable 320. Furthermore, this reduces a resistance of the ground plane by grounding cable 320 and connectors to the cargo handling system (e.g., cargo handling system 100) and/or the aircraft (e.g., aircraft 10).

Junction card 402 is spliced into cable 320, as previously described above. That is, cable 320 is electrically connected (e.g., soldered) to junction card 402. Junction card 402 is secured to tray 304 by posts 412. Posts 412 further serve as a ground connection for pigtail connector 420 because posts 412 are electrically grounded to tray 304. Therefore, posts 412 provide a path to ground for pigtail connector 420 which.

Figure 7:
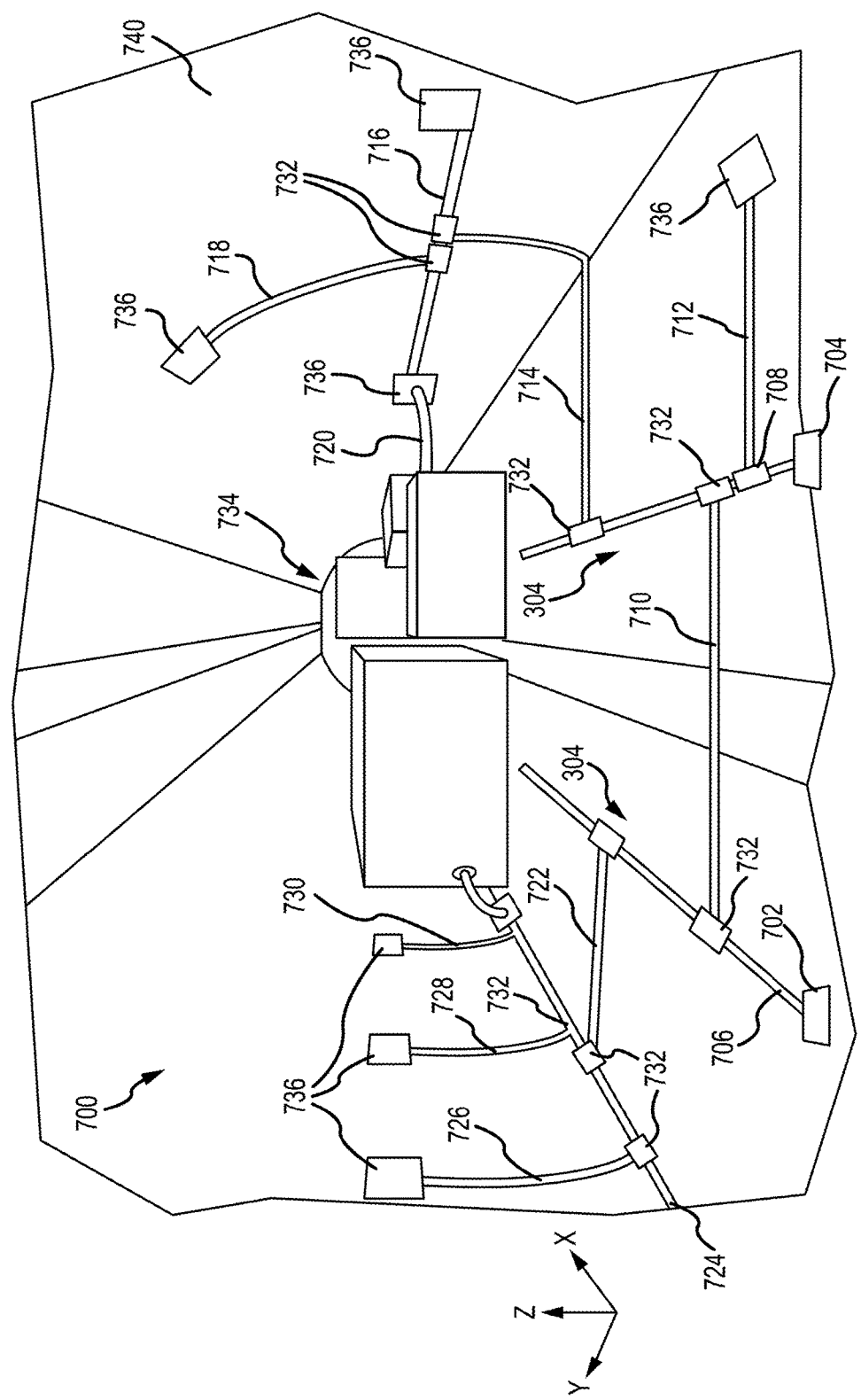
FIG. 7 illustrates above floor wire routing within a cargo handling system of an aircraft, in accordance with various embodiments.

Referring now to FIG. 7, a cargo handling system 700 including above floor wire routing is illustrated, in accordance with various embodiments. Cargo handling system 700 includes trays 304, a first power source 702, a second power source 704, cables 706, 708, 710, 712, 714, 716, 718, 720, 722, 724, 726, 728, 730, electric connectors 732, cargo 734, and line replaceable unit (LRU) connectors 736. Trays 304 extend longitudinally (e.g., along the x-axis) within cargo handling system 700. In various embodiments trays 304 may include one or more power drive units (e.g., PDU 310). Cables 706, 708 may be coupled to trays 304 above the floor of cargo handling system 700. In various embodiments, LRUs connected to LRU connectors 736 may include maintenance displays, system controllers, wireless access points, various sensor types, cameras, emergency stops, or docking station for controllers/maintenance unit (with wired or wireless charging and data transfer), among others. It should be appreciated, that the locations of the various cables, connectors, power sources, and trays described herein are for illustrated for discussion purposes and are not intended to be limiting as to quantity or location.

Cable 706 may be coupled to first power source 702 and cable 708 may be coupled to second power source 704. In various embodiments, first power source 702 and second power source 704 may be connected to an aircraft (e.g., aircraft 10) power source (e.g., an auxiliary power unit (APU)). In various embodiments, there may be more or fewer power source connections. As illustrated, cable 706 and cable 708 extend longitudinally (e.g., along the x-axis) within cargo handling system 700. Cable 710 extends axially (e.g., along the y-axis) and is coupled to cable 706 and cable 708. Cable 712 and cable 714 extend axially (e.g., in the positive y-direction) from cable 708 and are both coupled to cable 708. An electric connector 732 is located at each connection between cables. In various embodiments, electric connector 732 may be an example of electric connector 324 including junction card 402 as described in FIGS. 3A, 3B, and 4A-4D.

Cable 712 is connected to an LRU connector 736. LRU connectors 736 provide electrical and/or data access to LRUs within cargo handling system 700, such as for example, power drive units, sensors, cameras, or the like. In various embodiments, LRU connectors 736 may provide power to cargo 724, such as a unit load devices (ULD) or other cargo. In various embodiments, the ULDs may include GPS/smart enabled containers, refrigerated containers, modular crew rests, or seating pods in a flexible cargo system, among others. Cables 720 and 731 provide a connection between cargo 734 (e.g., ULD) and LRU connectors 736. In various embodiments, LRU connectors 736 may further include controllers for controlling cargo handling system 700. Cables 716, 718, 726, 728, and 730 are coupled to a wall 740 of cargo handling system 700 (e.g., interior wall of aircraft 10). In various embodiments, p-clamps may be used to couple cables 716, 718, 726, 728, 730 to wall 740. In various embodiments, other connectors may be used to couple cables 716, 718, 726, 728, 730 to wall 740, such as for example, rivet nuts. It should be understood that each cable 706, 708, 710, 712, 714, 716, 718, 720, 722, 724, 726, 728, 730 provides a connection from power source 702, 704 to an LRU or an LRU connector 736. Furthermore, it can be appreciated that, as described herein, cables 716, 718, 726, 728, 730 may be affixed, attached, coupled, mounted, or otherwise connected to any location along wall 740 including edges of wall panels, the center of wall panel, or other portions of wall 740 without removing any portion of wall 740 and without restriction as to where cables are 716, 718, 726, 728, 730 placed.

Typically, routing cables and cable management includes removing walls 740 of cargo handling system 700 or aircraft 10 in order to place the cables behind the walls. The aircraft (e.g., aircraft 10) may need to be recertified for flight after removing the walls. Historically metal conduit has been used to connect power and/or data cables to the walls of aircraft 10. However, it is difficult for the metal conduit to match the curves of aircraft 10. By utilizing the systems and methods disclosed herein, an aircraft (e.g., aircraft 10) and cargo handling system 700 may be rewired using above floor wire routing that reduces the time and expense related to labor, recertifications, and planning around other subsystems. This an improved system for cargo handling installations and retrofits.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 212(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An above floor wiring system, comprising:
   a tray including a sidewall;
   a wire bundle secured to the sidewall;
   a junction card coupled to the sidewall and electrically coupled to the wire bundle; and
   a post coupled to the junction card and the tray, the post securing the junction card to the tray and electrically grounding the junction card.

2. The above floor wiring system of claim 1, further comprising:
   a connector coupled to the wire bundle, the connector disposed at a first side of the tray; and
   a ground wire coupled to the connector and to the tray.

3. The above floor wiring system of claim 1, further comprising:
   a hole formed through the sidewall of the tray; and
   a surface mount connector coupled to the junction card and extending through the hole.

4. The above floor wiring system of claim 1, further comprising:
   a slot formed in the sidewall; and
   a pigtail connector coupled to the junction card and extending through the slot.

5. The above floor wiring system of claim 4, further comprising:
   a support bracket coupled to the sidewall and extending over the slot.

6. The above floor wiring system of claim 1, further comprising:
   a housing formed over the junction card; and
   a clamp securing the wire bundle to the tray.

7. A cargo handling system, comprising:
   a floor including an upper surface;
   a first tray coupled to the upper surface of the floor, the first tray extending in a first direction;
   a first wire bundle coupled to the first tray;
   a first junction card coupled to the first tray and coupled to the first wire bundle; and
   a post coupled to the first junction card and the first tray, the post securing the first junction card to the first tray and electrically grounding the first junction card.

8. The cargo handling system of claim 7, further comprising:
   a second tray coupled to the upper surface of the floor, the second tray disposed adjacent the first tray and extending in a second direction orthogonal to the first direction;
   a second wire bundle having a first end and a second end, the first end of the second wire bundle coupled to the first junction card; and
   a second junction card coupled to the second tray and the second end of the second wire bundle.

9. The cargo handling system of claim 7, further comprising:
   a wall extending from the upper surface of the floor, wherein the first wire bundle is further coupled directly to the wall; and
   a third junction card coupled to the wall and coupled to the first wire bundle.

10. The cargo handling system of claim 9, further comprising:
    a line replaceable unit connector coupled to the wall; and
    a third wire bundle coupled to the third junction card at a first end and coupled to the line replaceable unit connector at a second end.

11. The cargo handling system of claim 10, further comprising:
    a unit load device disposed on the upper surface of the floor; and
    a fourth wire bundle having a first end and a second end, the first end of the fourth wire bundle coupled to the unit load device and the second end of the fourth wire bundle coupled to the line replaceable unit connector.

12. The cargo handling system of claim 7, further comprising:
    a connector coupled to the first wire bundle;
    a power source coupled to the connector; and
    a ground wire coupled to the connector and to the first tray.

13. An aircraft, comprising:
    a cargo deck; and
    a cargo handling system disposed within the cargo deck, the cargo handling system including:
      a floor having an upper surface;
      a first tray coupled to the upper surface of the floor;
      a second tray coupled to the upper surface of the floor, the second tray disposed adjacent the first tray;
      a first wire bundle having a first end and a second end;
      a first connector coupled to the first end of the first wire bundle;
      a first junction card coupled to the second end of the first wire bundle and to the first tray;
      a second wire bundle having a first end and a second end;
      a second junction card coupled to the first end of the second wire bundle and to the second tray; and a second connector coupled to the second end of the second wire bundle, wherein the second connector is coupled to the first connector.

14. The aircraft of claim 13, the cargo handling system further comprising
   a power source; and
   a third wire bundle having a first end and a second end, the first end of the third wire bundle coupled to the power source and the second end of the third wire bundle coupled to the first junction card.

15. The aircraft of claim 13, the cargo handling system further comprising:
   an opening formed through the first tray; and
   a surface mount connector coupled to the first junction card, the surface mount connector extending through the opening in the first tray.

16. The aircraft of claim 13, the cargo handling system further comprising:
   a slot formed in the second tray; and
   a pigtail connector coupled to the second junction card, the pigtail connector extending through the slot in the second tray.

17. The aircraft of claim 13, the cargo handling system further comprising:
   a third wire bundle having a first end and a second end, the first end of the third wire bundle coupled to the first junction card; and
   a line replaceable unit connector coupled to the second end of the third wire bundle.

18. The aircraft of claim 13, the cargo handling system further comprising:
   a first ground wire coupled to the first connector and to the first tray; and
   a second ground wire coupled to the second connector and to the second tray.

\* \* \* \* \*